(12) United States Patent
Soldo

(10) Patent No.: US 11,491,450 B2
(45) Date of Patent: Nov. 8, 2022

(54) CAVITATION REACTOR

(71) Applicant: Three Es S.r.l., Lazzate MB (IT)

(72) Inventor: Marco Soldo, Lazzate MB (IT)

(73) Assignee: Three Es S.r.l., Lazzate MB (IT)

( * ) Notice: Subject to any disclaimer, the term of this patent is extended or adjusted under 35 U.S.C. 154(b) by 82 days.

(21) Appl. No.: 17/284,103

(22) PCT Filed: Oct. 7, 2019

(86) PCT No.: PCT/IB2019/058520
§ 371 (c)(1),
(2) Date: Apr. 9, 2021

(87) PCT Pub. No.: WO2020/075039
PCT Pub. Date: Apr. 16, 2020

(65) Prior Publication Data
US 2021/0354098 A1    Nov. 18, 2021

(30) Foreign Application Priority Data

Oct. 10, 2018  (IT) .................. 102018000009329

(51) Int. Cl.
*B01J 19/00*    (2006.01)
*B01F 25/64*    (2022.01)
(Continued)

(52) U.S. Cl.
CPC ........ *B01F 27/8111* (2022.01); *B01F 25/642* (2022.01); *B01J 19/008* (2013.01);
(Continued)

(58) Field of Classification Search
CPC .... B01F 27/8111; B01F 25/642; B01F 25/64; B01J 19/008; B01J 19/1806; B01J 19/1812; B01J 2219/1943
(Continued)

(56) References Cited

U.S. PATENT DOCUMENTS 7,354,227 B2    4/2008  Ramnauth et al.
2009/0184056 A1    7/2009  Smith et al.

FOREIGN PATENT DOCUMENTS

EP    3072579 A1 *    9/2016    .......... B01F 7/00808
EP    3278868           2/2018
(Continued)

OTHER PUBLICATIONS

Search Report dated Dec. 13, 2019; Application No. PCT/IB2019/058520; 5 pages.
(Continued)

*Primary Examiner* — Huy Tram Nguyen
(74) *Attorney, Agent, or Firm* — Mark E. Bandy; Rankin Hill & Clark, LLP

(57) ABSTRACT

A cavitation reactor that may be obtained from a centrifugal pump is described. The reactor comprises a stator and a rotor having at least one centrifugal stage accommodated in a chamber of the stator. Two walls of the centrifugal stage define a gap therebetween, which is divided into compartments in fluid communication with the chamber of the stator at the peripheral portion of the centrifugal stage. The wall of the centrifugal stage that is next to the inlet opening of the chamber of the stator is closed at the central portion of the centrifugal stage, to thereby prevent the flow of fluid from the inlet opening to the peripheral portion of the centrifugal stage through the gap.

12 Claims, 4 Drawing Sheets

(51) Int. Cl.
    *B01F 27/81*      (2022.01)
    *B01J 19/18*      (2006.01)
(52) U.S. Cl.
    CPC ....... *B01J 19/1806* (2013.01); *B01J 19/1812* (2013.01); *B01J 2219/1943* (2013.01)
(58) Field of Classification Search
    USPC ......................................................... 366/263
    See application file for complete search history.

(56)            References Cited

FOREIGN PATENT DOCUMENTS

WO    WO 2016182903    11/2016
WO    WO 2017184739    10/2017

OTHER PUBLICATIONS

Written Opinion dated Dec. 13, 2019; Application No. PCT/IB2019/058520; 6 pages.
Preliminary Report on Patentability dated Sep. 29, 2020; Application No. PCT/IB2019/058520; 7 pages.

* cited by examiner

CAVITATION REACTOR

FIELD OF THE INVENTION

The present invention finds application in the field of cavitation reactors, which use cavitation to process fluids, including for instance mixtures of liquids, mixtures of liquids and solids or liquids and gases, to improve homogeneity of the fluids that flow out of the reactor, or to reduce the size of the solid particles or gas bubbles dispersed in a liquid. In particular, the invention relates to an effective cavitation reactor having a simplified construction, and a method of manufacturing such reactor.

BACKGROUND ART

Cavitation occurs when a fluid that flows in a duct undergoes significant pressure changes, e.g. due to sudden changes in the speed or direction of the fluid. At the minimum-pressure locations of the duct, the equilibrium vapor pressure of the fluid may exceed the internal pressure of the fluid, thereby leading to the formation of vapor bubbles, especially in the areas in which the liquid is exposed to high tensile forces. When the fluid pressure increases again, for example because the fluid passes beyond the minimum pressure point as it enters a pump, the bubbles implode, thereby generating heat and ultrasonic hydrodynamic shock waves, which are likely to cause significant damage to pump parts.

In this case cavitation has a destructive effect and hence pumps and hydraulic systems are commonly designed to avoid bubble formation, by maintaining the fluid pressure always above a threshold value and avoiding sudden pressure changes that expose the fluid to tensions directed toward higher pressure areas.

In other contexts, cavitation may be controlled for using the shock waves and the heat generated thereby on a fluid to be processed, without causing damage to the equipment in which it occurs. Certain examples of useful applications of controlled cavitation include mixing, homogenization, heating, pasteurization, floating, emulsion, extraction, reaction and particulate or molecular reduction, for fluids such as mixtures of different liquids, mixtures of liquids and solid particles, or mixtures of liquids and gases. In order to avoid damage to equipment, cavitation must occur away from equipment parts, in the midst of the fluid.

One example of cavitator, or cavitation reactor, is disclosed in patent application EP 3278868, by the Applicant hereof. This reactor comprises a stator and a rotor, the latter being housed in a cylindrical cavity of the stator. The fluid is introduced into the cavity, is driven by the rotary motion of the rotor, flows around it, and is ejected out of the cavity. The rotor has a frustoconical shape and its lateral surface has blind holes formed therein, which contribute to the formation and implosion of bubbles.

Other prior art cavitation reactors include cylindrical rotors, which also have blind holes on their lateral surface. Examples of such reactors are disclosed in U.S. Pat. No. 7,354,227, US 2009184056 and DE 2016182903.

SUMMARY OF THE INVENTION

An object of the present invention is to provide a cavitation reactor having a simplified construction, thereby affording a reduction of manufacturing costs. A further object of the invention is to provide a cavitation reactor having high efficiency.

These and other objects are fulfilled by a cavitation reactor and a method of manufacturing a cavitation reactor as defined in any of the accompanying claims. In particular, the applicant has surprisingly found that a known centrifugal pump with closed impeller may be modified at a low cost to obtain a cavitation reactor that can be usefully employed without causing significant damage to the pump/reactor, or even without causing any damage at all thereto.

The cavitation reactor of the invention, like a centrifugal pump, comprises a stator and a rotor, having a centrifugal stage accommodated in a chamber inside the stator. The fluid can enter and exit the chamber through first and second openings of the stator. In particular, the first opening forms a guide for the longitudinal flow of the fluid, like the fluid inlet openings of the known pumps. The centrifugal stage comprises two walls arranged transverse to the direction of the rotation axis of the rotor. A gap is formed as a recess in the centrifugal stage between the two walls, is longitudinally delimited by inner surfaces of the two walls, facing each other, and is divided into compartments by circumferentially spaced partitions, consisting for example of the blades of a centrifugal pump. The gap is in fluid communication with the stator chamber, external to the centrifugal stage, at a peripheral portion of the centrifugal stage.

In prior art centrifugal pumps, fluid is known to flow through the gap, after entering it though an opening located centrally in one of the two walls that delimit the gap, in particular the wall that is closer to the first opening, through which the fluid is designed to enter, and then to exit the gap at the peripheral portion of the centrifugal stage. Unlike the prior art, according to the invention this wall is closed at its central portion.

Therefore, while fluid is anyway present in the gap, it is not forced to enter the gap to flow between the first opening and the second opening of the stator, but may flow, for example, around the centrifugal stage.

Advantageously, a differential pressure is obtained between the fluid outside the gap, which has a flow velocity in the stator as it is rotatably driven by the centrifugal stage, and the fluid inside the gap, which is static with respect to the centrifugal stage that contains it. Therefore, the fluid is exposed to a tension that causes the desired cavitation. The Applicant also found that cavitation tends to concentrate in the space between two partitions, away from them, where fluid has a lower friction, thereby avoiding damage to the centrifugal stage.

In a preferred embodiment, the compartments of the gap communicate with each other at the central portion of the centrifugal stage. Therefore, the fluid in this region is exposed to opposite tensile forces directed out of the centrifugal stage, which further helps cavitation to occur away from the reactor parts to be preserved.

This reactor may be formed from a suitable centrifugal pump, using well-established constructions which are optimized in terms of manufacturing costs, by closing the central opening for access to the gap. Of course, the pumping capability is significantly reduced as a result of such change, whereby the main application becomes cavitation.

It shall be noted that the cavitation reactor of the invention may be used both with fluid flowing from the longitudinally guiding first opening toward the second opening, and with fluid flowing from the second opening to the first opening, unlike centrifugal pumps which only afford a one-way flow.

BRIEF DESCRIPTION OF THE FIGURES

Further characteristics and advantages of the present invention will result more clearly from the illustrative, non-limiting description of a cavitation reactor as shown in the annexed drawings, in which.

DETAILED DESCRIPTION

Figure 1:
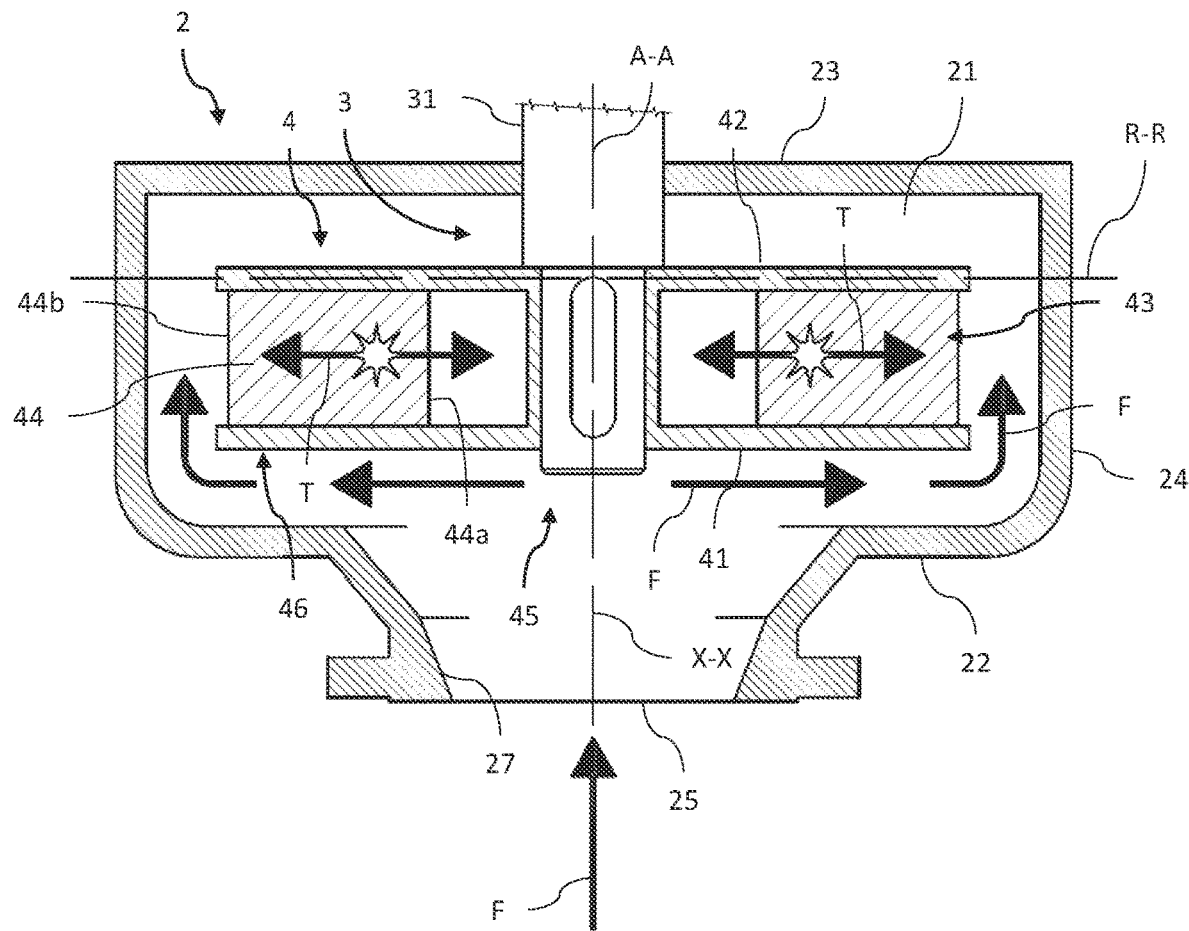
FIG. 1 shows a lateral sectional view of a cavitation reactor according to a first embodiment of the invention.

Referring to the accompanying figures, a cavitation reactor according to one embodiment of the invention is generally designated by numeral 1. The reactor 1 comprises a stator 2 and a rotor 3 rotatably connected to the stator 2.

The stator 2 delimits a chamber 21 which at least partially receives the rotor 3. More in detail, the chamber 21 of the stator 2 is delimited by a front wall 22, a rear wall 23 and a peripheral wall 24 of the stator 2. The front wall 22 and rear wall 23 are spaced apart in a longitudinal direction X-X. The peripheral wall 24 connects the front wall 22 and the rear wall 23, and is preferably formed as a centrifugal or cylindrical volute.

The stator 2 has a first opening 25 and a second opening 26 for a fluid to be introduced into the chamber 21 and ejected from the chamber 21. In particular, the first opening 25 may act as a fluid inlet and the second opening 26 may act as a fluid outlet or conversely the first opening 25 may act as a fluid outlet and the second opening 26 may act as a fluid inlet.

The first opening 25 has a guiding portion 27 whose shape is intended to guide the fluid flow in the longitudinal direction X-X. For instance, in the embodiments of the figures, the first opening 25 is formed in the front wall 22 of the stator 2. In other embodiments, the first opening 25 may have a channel, not necessarily straight, associated therewith and terminating toward the interior of the chamber 21, at the guiding portion 27.

In the embodiment which is shown in the figures the second opening 26 is formed in the peripheral wall 24 of the stator 2 to allow fluid to flow in a direction perpendicular to the longitudinal direction X-X, for example in a radial direction R-R that extends away from a longitudinal center axis of the stator 2. Nevertheless, embodiments may be also provided in which the second opening 26 is formed in the rear wall 23 of the stator 2.

The rotor 3 comprises a drive shaft 31 which mainly extends in the longitudinal direction X-X. The drive shaft 31 is connected to the stator 2 and is adapted to rotate relative to the stator 2 about a rotation axis A-A, which extends in the longitudinal direction X-X and preferably coincides with the longitudinal center axis of the stator 2.

The drive shaft 31 may be adapted for connection with an electric motor (not shown), either inside or outside the chamber 21 of the stator 2, to rotatably drive the rotor 3 relative to the stator 2.

The rotor 3 comprises at least one centrifugal stage 4 fixed to the drive shaft 31. Therefore, the centrifugal stage 4 is adapted to rotate relative to the stator 2 together with the drive shaft 31, about the rotation axis A-A.

As more clearly explained hereinafter, the rotor 3 may comprise a plurality of centrifugal stages 4, fixed to the drive shaft 31 and spaced apart in the longitudinal direction X-X, like in known multistage centrifugal pumps. The characteristics of a single centrifugal stage 4 will be first described, but they shall be understood to apply to all the stages 4, unless otherwise stated. In particular, the following characteristics preferably apply at least to the centrifugal stage 4 that is closest to the first opening 25 of the stator 2, i.e. closest to the front wall 22 of the stator 2.

The centrifugal stage 4 is accommodated in the chamber 21 of the stator 2, and is surrounded by the peripheral wall 24 the stator 2. Thus, the chamber 21 of the stator 2 has a tubular region which radially surrounds the entire centrifugal stage 4 and is defined between the centrifugal stage 4 and the peripheral wall 24 of the stator 2. The tubular region also surrounds the rotation axis A-A and preferably extends longitudinally from the front wall 22 to the rear wall 23 of the stator 2.

The guiding portion 27 of the first opening 25 of the stator 2 faces the centrifugal stage 4 in the longitudinal direction X-X and more in detail the rotation axis A-A extends through the guiding portion 27.

The centrifugal stage 4 comprises a first wall 41 and a second wall 42. The first and second walls 41, 42 are spaced apart in the longitudinal direction X-X to define a gap 43 therebetween.

The first wall 41 is proximal to the first opening 25 of the stator 30 and the second wall 42 is distal from the first opening 25. In other words, the first wall 41 is disposed between the second wall 42 and the first opening 25. More in detail, each of the first and second walls 41, 42 has an inner surface and an outer surface. The inner surfaces of the first and second walls 41, 42 face each other and face the gap 43.

Therefore, the gap 43 is a recess formed in the centrifugal stage 4 between the first and second walls 41, 42. In other words, the gap 43 is delimited in the longitudinal direction X-X by the inner surfaces of the first and second walls 41, 42. Furthermore, the gap 43 radially extends up to the tubular region of the chamber 2.

Instead, the outer surface of the first wall 41 is opposite to the corresponding inner surface and faces the first opening 25 of the stator 2. Likewise, the outer surface of the second wall 42 is opposite to the corresponding inner surface, but faces away from the first opening 25 of the stator 2.

The first and second walls 41, 42 are arranged transverse to the longitudinal direction X-X and the same applies to their respective inner and outer surfaces. Furthermore, the first and second walls 41, 42 radially project out of the drive shaft 31. For example, in the illustrated embodiments, the first and second walls 41, 42 are radially extending walls. Therefore, the rotor 3 is a radial rotor, in a similar manner as what is generally known for radial impellers of certain centrifugal pumps. In other words, the first and second walls 41, 42 may be shaped as disks or rings, with the rotation axis A-A at the center, and they may be arranged perpendicular to the longitudinal direction X-X. Accordingly, the gap 43 mainly extends substantially in the radial direction R-R.

The first and second walls 41, 42 do not necessarily have a planar shape like that schematically shown in the figures. Therefore, in other embodiments, the first and second walls 41, 42 may also have three-dimensional shapes adapted to define a conical or funnel-shaped rotor 3, like the conical impellers of known centrifugal pumps. In other words, in these walls a central portion, located at a central portion 45 of the centrifugal stage 4 close to the rotation axis A-A, projects toward the first opening 25 of the stator 2 with respect to a peripheral portion of the wall, located at a peripheral portion 46 of the centrifugal stage 4 spaced apart from the rotation axis A-A.

The centrifugal stage 4 comprises a plurality of partitions 44 arranged in the gap 43. The partitions 44 may be shaped as blades of a centrifugal pump, and may therefore have straight or curved profiles, thereby defining acute or grave angles with a circumferential direction C-C that extends about the rotation axis A-A, oriented in the rotation direction of the rotor 3. Nevertheless, it shall be noted the controlled cavitation effect may be obtained in both possible directions of rotation of the rotor 3 about the rotation axis A-A.

Each partition 44 extends between an inner end 44a, close to the rotation axis A-A, and a peripheral end 44b, spaced apart from the rotation axis A-A. Moreover, the partitions 44 are circumferentially spaced apart about the rotation axis A-A. Therefore, the partitions 44 divide the gap 43 into a plurality of compartments 47 which extend between the central portion 45 of the centrifugal stage 4 and the peripheral portion 46 of the centrifugal stage 4.

The partitions 44 are designed to rotatably drive the fluid in the gap 43 when the drive shaft 31 rotates relative to the stator 2. This will create a pressure difference between the fluid in the gap 43 at the central portion 45 of the centrifugal stage 4, and the fluid at the peripheral portion 45 of the centrifugal stage 4. This pressure difference caused by centrifugal rotation forces tends to cause the fluid to flow through the compartments 47 from the central portion 45 to the peripheral portion 46 of the centrifugal stage 4. In other words, the pressure at the central portion 45 is lower than that at the peripheral portion 46.

The gap 43, and particularly the compartments 47, are in fluid communication with the tubular region of the chamber 21 of the stator 2 at the peripheral portion 46 of the centrifugal stage 4. In other words, a free peripheral edge of the first wall 41 is spaced apart from a free peripheral edge of the second wall 42, preferably in the longitudinal direction X-X. Therefore the fluid in the chamber 21 may flow in and out of the gap 43 between the free peripheral edges of the first and second walls 41, 42.

In one aspect of the invention, the first wall 41 is closed at the central portion 45 of the centrifugal stage 4 thereby preventing the flow of fluid between the first opening 25 and the peripheral portion 46 of the centrifugal stage 4 through the gap 47, namely through the compartments 47 thereof. More in detail, at the central portion 45 fluid communication is prevented between the chamber 21 of the stator 2, outside the centrifugal stage 4, and the gap 43. Furthermore, in the preferred embodiment, the gap 43 is in fluid communication with the rest of the chamber 21, namely with the tubular region of the chamber 21, only at the peripheral portion 46 of the centrifugal stage 4, between the free peripheral edges of the first and second walls 41, 42.

It shall be noted that, like in prior art centrifugal pumps, the second wall 42, is likewise closed at the central portion 45 of the centrifugal stage 4 thereby preventing the flow of fluid between the second opening 26 and the peripheral portion 46 of the centrifugal stage 4 through the gap 47.

Figure 2:
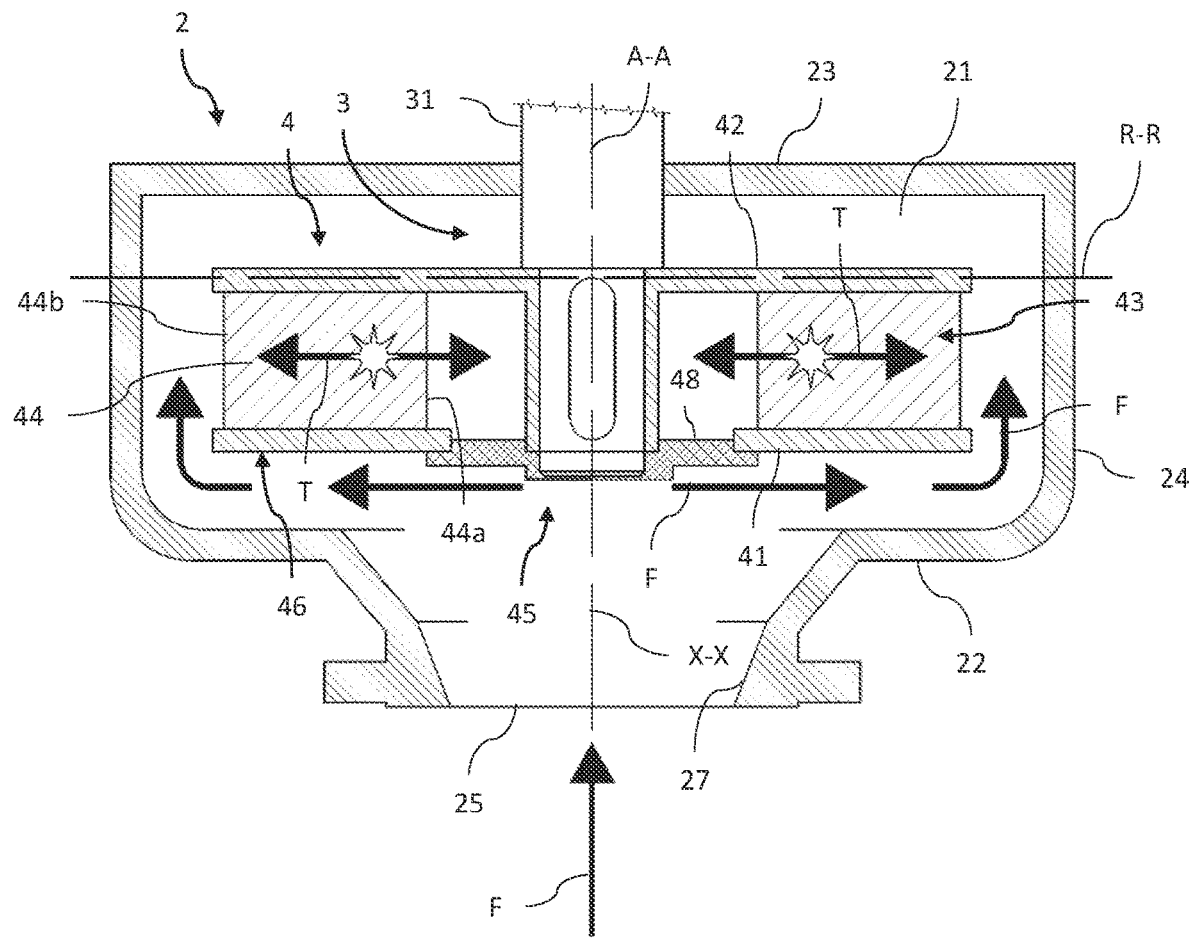
FIG. 2 shows a lateral sectional view of a cavitation reactor according to another embodiment of the invention.
Figure 3:
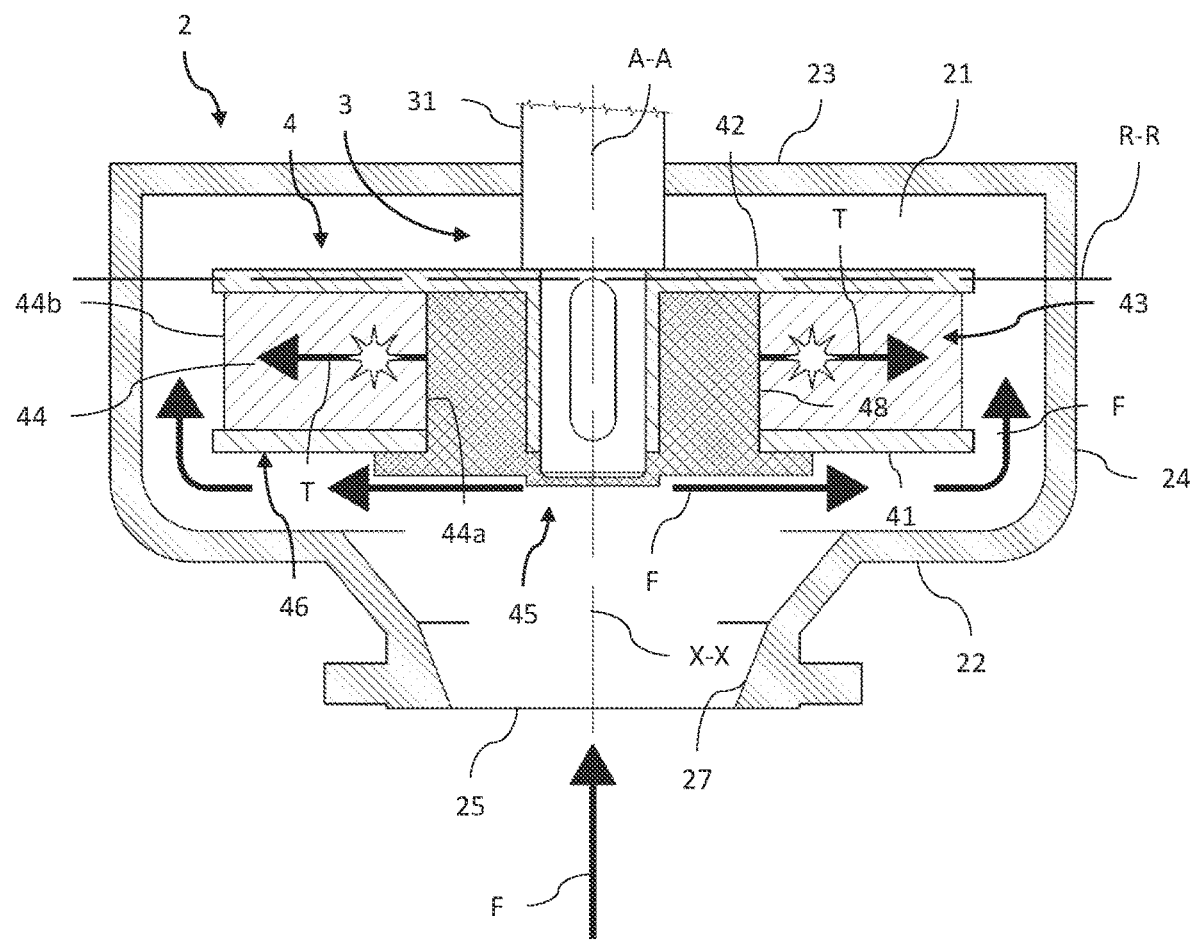
FIG. 3 shows a lateral sectional view of a cavitation reactor according to a further embodiment of the invention.
Figure 4:
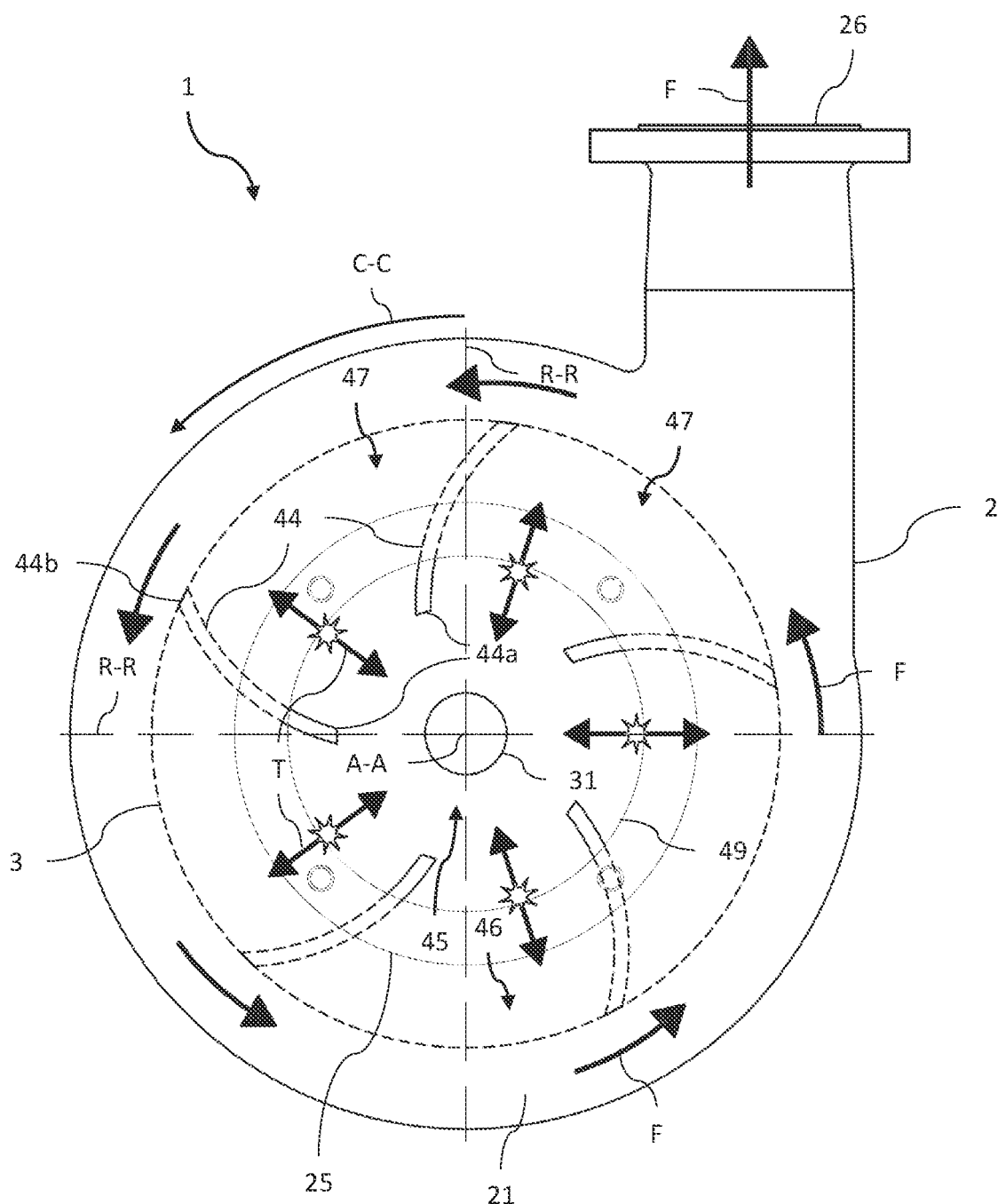
FIG. 4 shows a front view of the cavitation reactor of FIG. 3, in which a closure member of the reactor is not shown.

In certain embodiments, the first wall 41 is closed by a closure member 48 of the centrifugal stage 4, as shown for example in FIGS. 2-4. More in detail, the first wall 41 of the centrifugal stage 4 has a central opening 49 at the central portion 45 of the centrifugal stage 4. The closure member 48 is fixed to the first walls 41, preferably in a removable manner, to close the central opening 49.

When free of closing members 48, such central opening 49 may be adapted to act as a fluid intake for the centrifugal stage 4, like in known centrifugal pumps. With a clear central opening 49, the fluid would access the chamber 21, for instance, through the first opening 25, would be drawn into the gap 43 through the central opening 49 due to the aforementioned pressure difference, would later flow in the gap 43 toward the peripheral portion 46 of the centrifugal stage 4, and would be ejected out of the gap 43 into the tubular region of the chamber 21 to reach the second opening 26.

However, the closure member 48 occludes this fluid path. In particular, the fluid will not continuously flow in the radial direction in the gap 43, and only a fluid mix will be provided between the interior of the gap 43 and the tubular region of the chamber 21, outside the gap 43, at the peripheral portion 46 of the centrifugal stage 4.

The embodiment with the central opening 49 may be obtained from a known centrifugal pump (not shown), in particular from a centrifugal pump with closed impeller (or rotor), which may exhibit substantially all the features as discussed heretofore, excepting the fact that the first wall 41 of the centrifugal stage 4 is closed at the central portion 45. Once this pump has been provided, a closure member 48 shall be simply fixed to the first wall 41 to close its central opening 49.

Alternatively, as shown in FIG. 1, the first wall 41 may have no central openings 49 and be formed, for example, like a solid disk or a funnel having the smaller mouth closed. This may be deemed to be equivalent to the formation of a closure member 48 of one piece with the first wall 41. Therefore, this embodiment does not require changes to be made to a known centrifugal pump after fabrication, but may possibly require a design change, before fabrication, with still low costs.

It shall be noted that, since the typical fluid path of centrifugal pumps is closed, as described above, an alternative passage for the fluid flow should be provided between the first opening 25 and the second opening 26 of the chamber 21. Therefore, in the preferred embodiment the first wall 41 of the centrifugal stage 4 is spaced apart from the front wall 22 of the stator 2. Furthermore, the peripheral portion 46 of the centrifugal stage 4 is spaced apart from the peripheral wall 24 of the stator 2. Relatively small distances are anyway acceptable, as long as they are sufficient for the passage of fluid as described below.

This will allow the fluid to flow between the first opening 25 and the second opening 26 around the centrifugal stage 4 through the tubular region. More in detail, the fluid flows through the first opening 25, it flows between the first wall 41 of the centrifugal stage 4 and the front wall 22 of the stator 2, in a substantially radial direction R-R, then it flows into the tubular region, i.e. between the peripheral portion 46 of the centrifugal stage 4 and the peripheral wall 24 of the stator 4, in a substantially longitudinal direction X-X and preferably with circumferential components due to the rotation of the rotor 3, and finally it flows through the second opening 26. Alternatively, a fluid flow is also admitted in the same parts of the cavitation reactor 1 in the direction opposite to the above.

This fluid flow path is schematically illustrated in the figures by the arrows F. Nevertheless, it shall be understood that an operation with the rotor 3 rotating in a direction opposite to that of the arrows F is also admitted.

In the preferred embodiment, as shown in FIG. 2, the compartments 47 of the gap 43 are in fluid communication with each other at the central portion 45 of the centrifugal stage 4. In other words, the inner ends 44a of two contiguous partitions 44 define a free passage therebetween for the fluid, from one compartment 47 arranged between the two partitions 44 to the rest of the compartments 44. Advantageously, the fluid in the gap 43 at the central portion 45 of the centrifugal stage 4 is exposed to opposite tensile forces, generally referenced with the double-headed arrows T, directed toward the peripheral portion 46 of the centrifugal stage 4, which facilitate cavitation.

In an alternative embodiment, as shown in FIG. 3, fluid communication between the compartments 47 of the gap 43, at the central portion 45 of the centrifugal stage 4 is prevented, for example by the closure member 48. In other words, the closure member 48 contacts the inner ends 44a of the partitions 44, and more in detail the closure member 48 is shaped to occlude the space between the inner ends 44a of pairs of contiguous partitions 44. Cavitation is anyway obtained due to the pressure difference between the central portion 45 and the peripheral portion 46 of the centrifugal stage 4. Accordingly, the fluid is exposed to a one-way tensile force.

The Applicant found that the operation of the cavitation reactor 1 requires the rotor 3 to be entirely immersed in the fluid. In particular, it is worthwhile to ensure air to be expelled from the gap 43 should be.

For this purpose, pressure-regulating members are preferably provided, which are configured to maintain fluid pressure in the chamber 21 above a threshold value which is adapted to prevent air accumulation in the gap 43, especially at the central portion 45 of the centrifugal stage 4.

However, a skilled person will promptly understand that the pressure in the gap 43 is strongly affected by the installation conditions of the cavitation reactor 1, in the context of a hydraulic system configured to feed fluid to the reactor 1 for processing and to receive processed fluid. Therefore, pressure regulation may be carried out by parts of the hydraulic system that are outside the reactor 1, for example one or more pumps or valves of the hydraulic system, or otherwise the pressure-regulating members may be provided separate from the reactor 1, or may also be omitted, depending on the structural and operation features of the hydraulic system.

As explained above, the rotor 3 may comprise one or more centrifugal stages 4, fixed to the drive shaft 31 and spaced apart in the longitudinal direction X-X, like in known multistage centrifugal pumps. The centrifugal stages 4 may be all accommodated in the same chamber 21 of the stator 2, or in distinct chambers 21 of the stator 2.

This may be provided for the fluid to undergo stronger cavitation, or in view of providing a cavitation reactor 1 that also has pumping functions, in addition to cavitation capabilities. In other words, a single monolithic device may be adapted to accomplish controlled cavitation and conventional pumping tasks at the same time.

Here, the rotor 3 comprises centrifugal stages 4 of two types, i.e. at least one first centrifugal stage 4 for cavitation, incorporating the features as discussed heretofore, and at least one second centrifugal stage for pumping (not shown). Each second centrifugal stage may include some of the features as set forth above, but not the features concerning closure of the first wall 41.

In particular, for the second centrifugal stage the first wall 41 has a clear central opening 49 at the central portion 45 of the stage 4. Thus, the second centrifugal stage is configured to pump the fluid from the clear central opening 49 to its peripheral portion 46 through its gap 43, along the compartments 47. Therefore, pumping centrifugal stages differ from cavitation centrifugal stages 4 in that they have a clear central opening 49 for fluid to access the gap 43 and in that they do not have their first wall 41 closed by its own design or due to the provision of a closure member 48 at the central, not clear, opening 49.

Preferably, pumping centrifugal stages are arranged upstream the cavitation centrifugal stages 4, for a maximum fluid pressure to be provided in cavitation stages. In other words, the first centrifugal stage 4 is distal from the first opening 25 of the stator 2, and the second centrifugal stage is proximal to the first opening 25 of the stator 2, i.e. the first centrifugal stage 4 is arranged between the second centrifugal stage and the first opening 25 of the stator 2.

A skilled person may obviously envisage a number of equivalent changes to the above discussed variants, without departure from the scope as defined by the appended claims.

The invention claimed is:

1. A cavitation reactor, comprising:
   a stator, delimiting a chamber, the stator having a first and a second opening for a fluid to be introduced into and ejected from the chamber, and
   a rotor comprising a drive shaft, connected to the stator and rotatable relative to the stator about a rotation axis which extends in a longitudinal direction, the rotor comprising a centrifugal stage fixed to the drive shaft and housed in the chamber of the stator, the first opening of the stator having a lead-in portion facing the centrifugal stage in the longitudinal direction and shaped to longitudinally guide the flow of fluid,
   wherein:
   the centrifugal stage comprises a first wall proximal to the first opening of the stator and a second wall distal from the first opening of the stator, the first and second walls being arranged transverse to the longitudinal direction, and being spaced apart in the longitudinal direction to define a gap therebetween, wherein each of the first and second walls has an inner surface, the inner surfaces of the first and second walls facing each other and facing the gap, the gap being delimited in the longitudinal direction by the inner surfaces of the first and second walls, the gap being a recess formed in the centrifugal stage between the first and the second wall,
   the centrifugal stage comprises a plurality of partitions in the gap which are circumferentially spaced apart about the rotation axis, the partitions dividing the gap into a plurality of compartments which extend between a central portion of the centrifugal stage, closer to the rotation axis, and a peripheral portion of the centrifugal stage, farther from the rotation axis, the compartments being in fluid communication with the chamber of the stator at the peripheral portion of the centrifugal stage,
   the first wall is closed at the central portion of the centrifugal stage thereby preventing the flow of fluid between the first opening of the stator and the peripheral portion of the centrifugal stage through the compartments of the gap.

2. A cavitation device as claimed in claim 1, wherein:
   the chamber has a tubular region that radially surrounds the entire centrifugal stage, and
   the gap is in fluid communication with the tubular region of the chamber of the stator at the peripheral portion of the centrifugal stage.

3. A cavitation reactor as claimed in claim 1, wherein the gap extends mainly substantially in a radial direction extending away from a longitudinal center axis of the stator.

4. A cavitation reactor as claimed in claim 1, wherein the first wall of the centrifugal stage has a central opening at the central portion of the centrifugal stage, the centrifugal stage comprising a closure member fixed to the first wall to close the central opening.

5. A cavitation reactor as claimed in claim 4, wherein the closure member is shaped to prevent fluid communication between the compartments of the gap at the central portion of the centrifugal stage.

6. A cavitation reactor as claimed in claim 1, wherein the compartments of the gap are in fluid communication with each other at the central portion of the centrifugal stage.

7. A cavitation reactor as claimed in claim 1, wherein the partitions are shaped to cause fluid rotation in the gap when the drive shaft rotates relative to the stator, thereby creating a pressure difference between the fluid in the gap at the central portion of the centrifugal stage and the fluid at the peripheral portion of the centrifugal stage.

8. A cavitation reactor as claimed in claim 1, wherein:
the chamber of the stator is delimited by a front wall in which the first opening is formed, a rear wall spaced apart from the front wall in the longitudinal direction, and a peripheral wall that connects the front wall and the rear wall together and surrounds the centrifugal stage,
the first wall of the centrifugal stage is spaced apart from the front wall of the stator, and the peripheral portion of the centrifugal stage is spaced apart from the peripheral wall of the stator, to thereby allow fluid to flow between the first opening and the second opening around the centrifugal stage.

9. A cavitation reactor as claimed in claim 1, wherein the rotor comprises a plurality of centrifugal stages fixed to the drive shaft and spaced apart from each other in the longitudinal direction, the first wall of at least one first centrifugal stage being closed at its central portion to prevent the flow of fluid between the first opening of the stator and the relative peripheral portion through the compartments of the relative gap, at least one second centrifugal stage having a clear central opening at the central portion, the second centrifugal stage being configured to pump the fluid from the clear central opening to the relative peripheral portion through the compartments of the gap.

10. A cavitation reactor as claimed in claim 9, wherein the first centrifugal stage is distal from the first opening of the stator, and the second centrifugal stage is proximal to the first opening of the stator.

11. A cavitation reactor as claimed in claim 1, comprising pressure regulating means, which are configured to keep the pressure of the fluid in the chamber above a threshold value which is adapted to prevent air accumulation in the gap.

12. A method of manufacturing a cavitation reactor, including the steps of:
providing a centrifugal pump comprising:
a stator, delimiting a chamber, the stator having a first opening for a fluid to be introduced into the chamber and a second opening for the fluid to be ejected from the chamber, and
a rotor comprising a drive shaft, connected to the stator and rotatable relative to the stator about a rotation axis which extends in a longitudinal direction, the rotor comprising a centrifugal stage fixed to the drive shaft and housed in the chamber of the stator, the first opening of the stator having a lead-in portion facing the centrifugal stage in the longitudinal direction and shaped to longitudinally guide the flow of fluid,
wherein:
the centrifugal stage comprises a first wall and a second wall, arranged transverse to the longitudinal direction and spaced apart in the longitudinal direction to define a gap therebetween, wherein each of the first and second walls has an inner surface, the inner surfaces of the first and second walls facing each other and facing the gap, the gap being delimited in the longitudinal direction by the inner surfaces of the first and second walls, the gap being a recess formed in the centrifugal stage between the first and the second wall, the first wall being placed between the second wall and the first opening of the stator,
the centrifugal stage comprises a plurality of partitions in the gap which are circumferentially spaced apart about the rotation axis, the partitions dividing the gap into a plurality of compartments which extend between a central portion of the centrifugal stage, closer to the rotation axis, and a peripheral portion of the centrifugal stage, farther from the rotation axis, the compartments being in fluid communication with the chamber of the stator at the peripheral portion of the centrifugal stage,
the first wall of the centrifugal stage has a central opening at the central portion of the centrifugal stage, and
fixing a closure member to the first wall to close the central opening.

* * * * *